United States Patent [19]

Hodgkins

[11] Patent Number: 4,618,423
[45] Date of Patent: Oct. 21, 1986

[54] DISPOSABLE FUEL FILTER/WATER SEPARATOR ELEMENT

[75] Inventor: David Hodgkins, Manchester, Conn.
[73] Assignee: Stanadyne, Inc., Windsor, Conn.
[21] Appl. No.: 686,643
[22] Filed: Dec. 27, 1984

Related U.S. Application Data

[62] Division of Ser. No. 507,799, Jun. 24, 1983, Pat. No. 4,491,120.

[51] Int. Cl.⁴ .............................................. B01D 29/06
[52] U.S. Cl. ................................... 210/305; 210/307; 210/314
[58] Field of Search ..................... 210/799, 299–301, 210/305, 307, 314, 320, 416.4

[56] References Cited

U.S. PATENT DOCUMENTS

| | | | |
|---|---|---|---|
| 3,245,541 | 4/1966 | Silverwater | 210/307 |
| 3,312,351 | 4/1967 | Kasten | 210/307 |
| 3,465,883 | 9/1969 | Jumper | 210/307 |
| 3,491,882 | 1/1970 | Elam | 210/799 |
| 3,502,218 | 3/1970 | Tuffnell et al. | 210/305 |
| 3,852,193 | 12/1974 | Jakubek et al. | 210/799 X |
| 4,309,289 | 1/1982 | Head | 210/799 X |
| 4,374,029 | 2/1983 | Jaisinghani | 210/799 X |

Primary Examiner—Thomas Wyse
Attorney, Agent, or Firm—McCormick, Paulding & Huber

[57] ABSTRACT

A modular fuel conditioner having a base and a disposable filter/water separator cartridge releasably secured to the base and defining a filter chamber in fluid communication with fuel inlet and outlet passageways in the base. A three stage filter assembly within the cartridge includes filtering and coalescing media and separates an upper portion of the chamber from a lower portion which defines a water collection sump. A heater in the base warms fuel before it enters the cartridge. Sensing devices in the base are provided for operating signals to indicate the presence of a predetermined quantity of water in the sump and the occurrence of a plugged filter condition. A priming pump on the base is manually operated to restore the fuel conditioner to operational condition after cartridge replacement.

8 Claims, 11 Drawing Figures

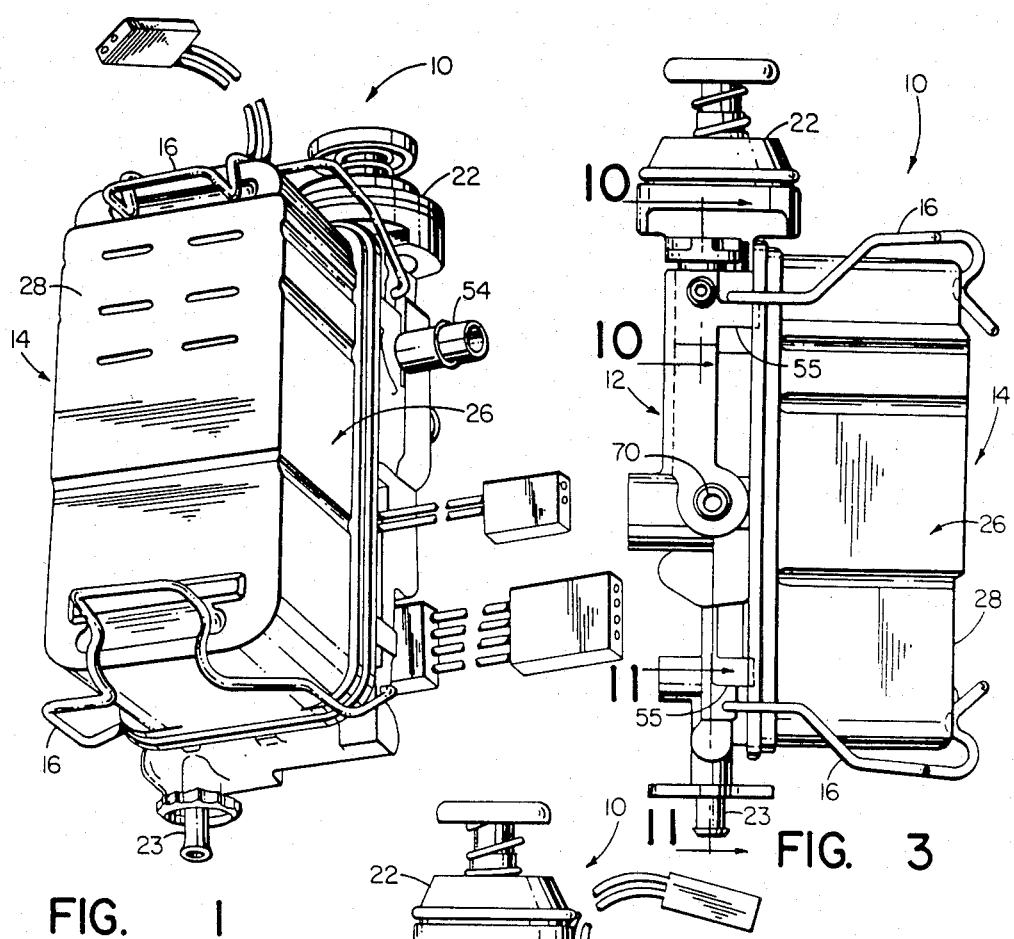
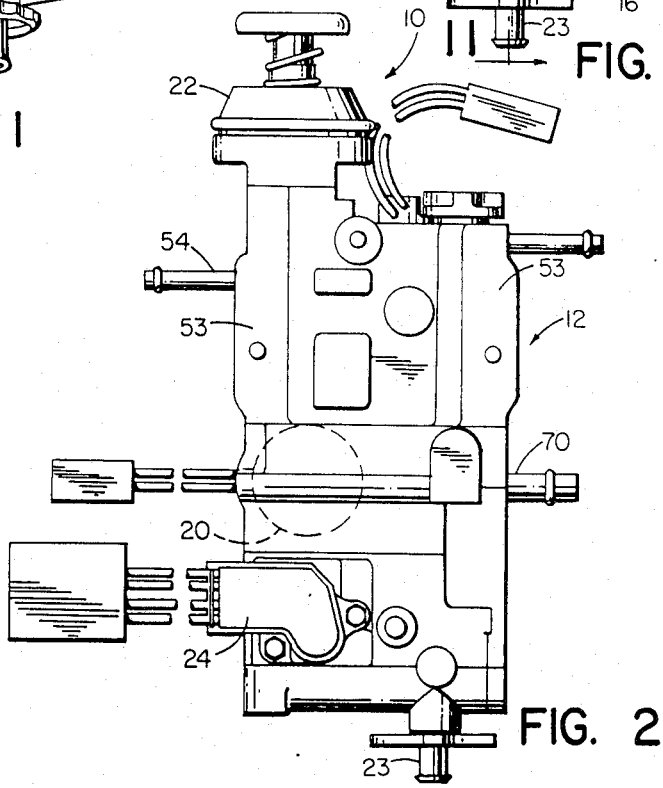
FIG. 1
FIG. 3
FIG. 2

4,618,423

DISPOSABLE FUEL FILTER/WATER SEPARATOR ELEMENT

CROSS-REFERENCE TO RELATED APPLICATION

This application is a division of application Ser. No. 507,799, filed June 24, 1983, now U.S. Pat. No. 4,491,120 issued Jan. 1, 1985 and assigned to the assignee of the present application.

BACKGROUND OF THE INVENTION

This invention relates in general to apparatus for filtering and separating liquids and deals more particularly with a fuel conditioning apparatus for removing foreign particles and separating water from fuel in the fuel supply system for an internal combustion engine or the like. The fuel conditioner of the present invention is particularly adapted for connection in the fuel supply system for a diesel engine to remove foreign particles and separate water from fuel before supplying the fuel to the engine.

Increasing demands for diesel fuel have resulted in a marked increase in poorly handled fuel on the market. More water is being found in fuel than ever before. Abrasive particles in diesel fuel can permanently damage precision components in a fuel-injection pump or cause wear which can destroy the ability of the pump to meter or deliver fuel at high pressure. The presence of water in diesel fuel can cause rusting and freezing resulting in the seizure of moving parts and/or clogging of the vital fuel injection system.

Diesel fuel contains a waxy constituent which precipitates as small wax crystals when the fuel temperature drops below its "cloud point". During cold weather operation, these wax crystals can quickly plug a fuel filter and thereby cut-off fuel delivery to an engine. This condition is particularly noticeable with Number 2 diesel fuel, and is expected to become even more prevalent in the future, because of fuel grade modifications.

Fuel conditioners have heretofore been provided for connection in a fuel supply system for removing particulate material and separating water from fuel. In a fuel conditioner of the type which utilizes a throwaway filter element or disposable cartridge, some fuel invariably escapes from associated fuel lines when a contaminated cartridge is removed and replaced by a new one. The usual procedure for restoring an engine to operation after a fuel conditioner cartridge has been replaced is to crank the engine until air has been expelled from the fuel supply system and normal flow of fuel to the engine has been restored. This procedure causes battery drain and unnecessary wear to the starter and other engine parts.

Accordingly, it is the general aim of this invention to provide an improved fuel conditioner which enables more efficient removal of foreign particles and separation of water from fuel. It is a further aim of the invention to provide an improved fuel conditioner of disposable cartridge type which includes means for preventing or at least substantially reducing waxy buildup in the filter media within the disposable cartridge to permit operation at lower temperatures. A still further aim of the invention is to provide an improved fuel conditioner for the fuel supply system of an internal combustion engine and which includes means for restoring the fuel supply system to its normal fuel delivery condition after a disposable cartridge is replaced and without cranking the engine.

SUMMARY OF THE INVENTION

In accordance with the present invention an improved fuel conditioner comprises a base having a fuel inlet passageway, partially defined by a heating chamber, and a fuel outlet passageway. A thermally activated fuel heater disposed within the heating chamber is responsive to a predetermined temperature of fuel. The fuel conditioner further includes a disposable fuel filter/water separator element having a housing which defines a filter and water collection chamber. A fuel inlet port in the housing communicates with an upper portion of the filter chamber and a fuel outlet port in the housing communicates with a sump in the lower portion of the filter chamber. A filter assembly disposed within said filter chamber extends thereacross to separate the upper portion of the filter chamber from the lower portion of the chamber. The filter assembly includes a plurality of elements arranged in vertical series and through which fuel flowing from the fuel inlet port to said fuel outlet port is constrained to pass. The elements include a primary filter element and a coalescing element. The fuel filter/water separator element is releasably secured to the base with the fuel inlet passageway in communication with the fuel inlet port and the fuel outlet passageway in communication with the fuel outlet port.

BRIEF DESCRIPTION OF THE DRAWINGS

FIG. 1 is a perspective view of a fuel conditioner embodying the present invention.

FIG. 2 is a rear view of the fuel conditioner shown in FIG. 1.

FIG. 3 is a left side elevational view of the fuel conditioner shown in FIG. 1.

DETAILED DESCRIPTION OF PREFERRED EMBODIMENT

Figure 4:
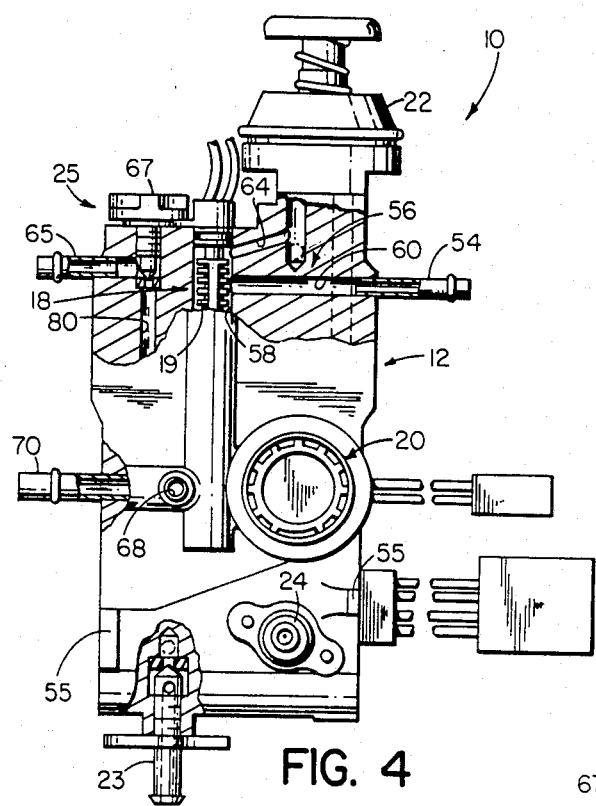
FIG. 4 is a front view of the fuel conditioner shown in partial vertical section and with the disposable filter/water separator cartridge removed.

Turning now to the drawings, and referring first particularly to FIGS. 1-4, a modular fuel conditioner embodying the present invention is indicated generally by the reference numeral 10. The illustrated fuel conditioner 10 is particularly adapted for connection in the fuel system for a diesel engine, (not shown) such as may be used in an automotive, agricultural, power, construction or marine application, and includes a base, indicated generally at 12. The fuel conditioner is adapted for mounting in a vertically disposed position on a supporting structure, such as the firewall of an engine compartment, and further includes a throwaway filter/water separator element or disposable cartridge, designated generally by the numeral 14, which contains fuel filter media and coalescing material for concentrating water disbursed in the fuel for collection within the cartridge and ultimate removal from the system. Spring retaining clips 16, 16, mounted on the base 12 releasably retain the disposable cartridge 14 in assembly with the base and in fluid communication with passageways in the base, as will be hereinafter more fully described.

A heater, indicated generally at 18, is preferably provided and mounted in the base to heat fuel before it enters the cartridge 14 and thereby protect the filter media from wax plugging in cold environments when temperatures fall below fuel "cloud point". The heater 18 has a heating element 19, best shown in FIG. 4. When the filter media within the cartridge 14 does become plugged, a filter change signalling device 20 is activated to operate a remote signal, such as a signal lamp (not shown), to indicate the necessity for changing the throwaway cartridge. A manually operable priming pump 22 mounted on the base 12 of the illustrated fuel conditioner facilitates priming of the fuel system after a cartridge has been changed or the occurrence of fuel exhaustion. The priming pump 22 also provides a convenient means for expelling water collected within the fuel conditioner. Another signal device or water sensor 24 operates another remote signal, such as a signal lamp (not shown), when a predetermined quantity of water has collected within the fuel conditioner, to provide early warning that the fuel conditioner should be drained before an excessive amount of water has accumulated. A drain cock 23 mounted on the base 12 is provided for draining water which accumulates within the fuel conditioner. A venting means indicated generally at 25 is also provided for venting air from the fuel conditioner 10.

Referring further to FIGS. 6–9, the throwaway cartridge 14 is adapted for plugging connection with the base 12 in fluid communication with passageways formed in the base, as will be hereinafter more fully described. The cartridge 14 has a generally rectangular housing, indicated generally at 26, which includes a rectangular cup-shaped front portion 28 and a rear wall 30 joined in assembly with the front portion to form a sealed container which defines a generally rectangular filter chamber 32. A filter assembly, indicated generally at 34, and contained within the filter chamber 32, extends transversely across the housing 26 and is sealed to associated walls of the housing by a suitable sealing compound 35 to separate the upper portion of the chamber from the lower portion, which defines a sump 36. The filter assembly 34 essentially comprises a primary filter element 38 and a coalescing element 40, disposed between the primary filter element and the sump. The illustrated filter assembly 34 further includes a generally horizontally disposed secondary filter element 42 located between the primary element 38 and the coalescing element 40. Each of the filter elements is made from treated filter paper having a multiplicity of closely spaced pleats and a rectangular block-shaped form. The coalescing media is a nylon material arranged in serpentine pleats, substantially as shown.

Figure 5:
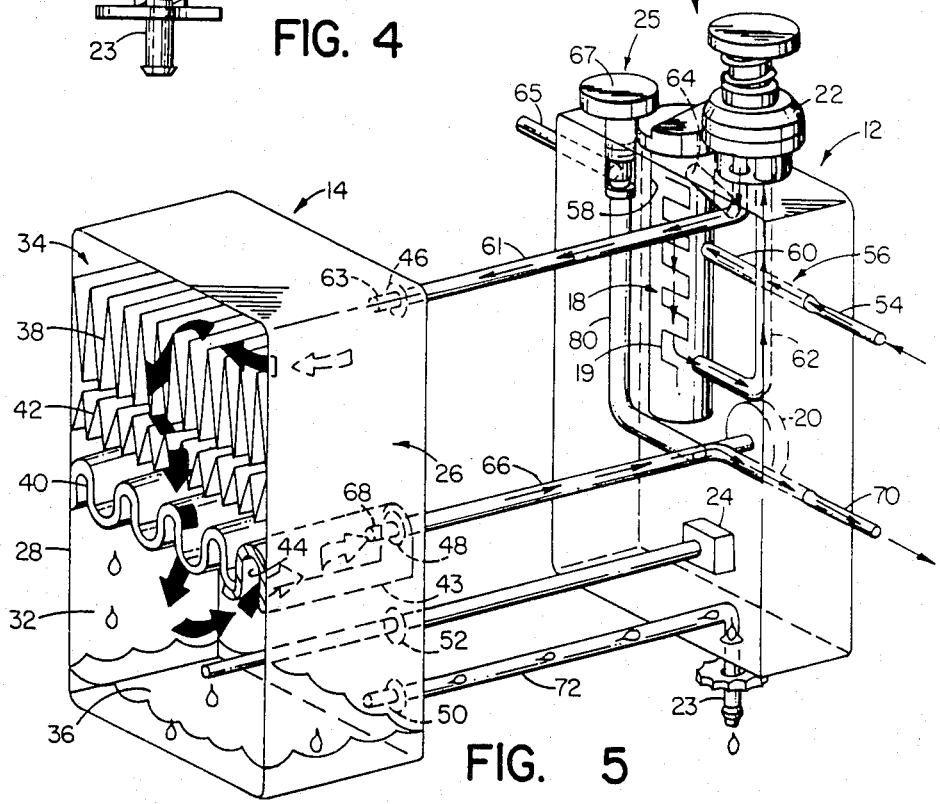
FIG. 5 is a somewhat schematic exploded view of the fuel conditioner and illustrates the fuel flowpath therethrough.
Figure 7:
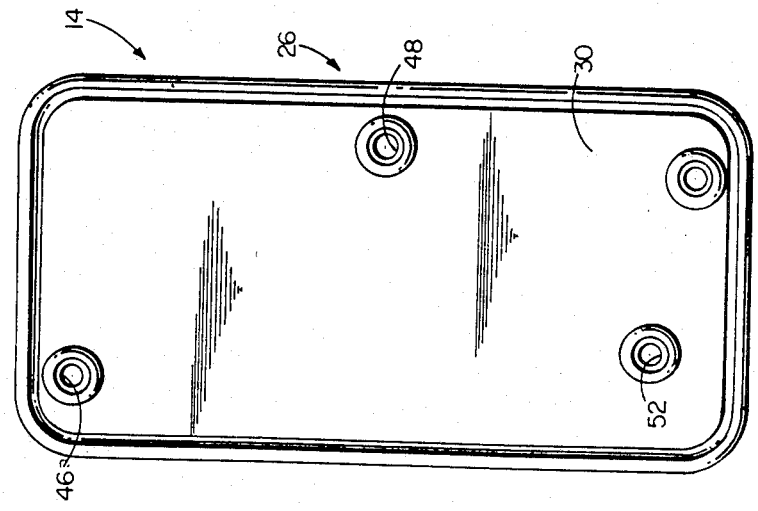
FIG. 7 is a somewhat enlarged rear view of the disposable filter/water separator cartridge.
Figure 6:
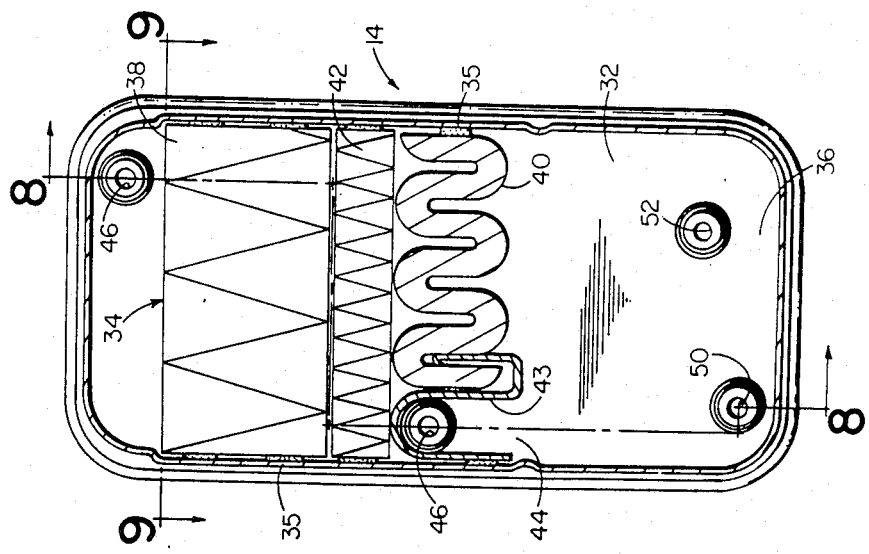
FIG. 6 is a somewhat enlarged sectional view through the disposable filter/water separator cartridge taken along the line 6—6 of FIG. 3.
Figure 8:
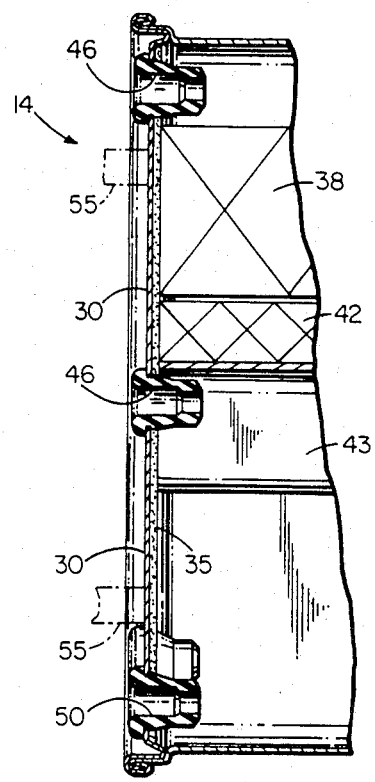
FIG. 8 is a sectional view taken generally along the line 8—8 of FIG. 6, positioning bosses on the base being shown in phantom.
Figure 9:
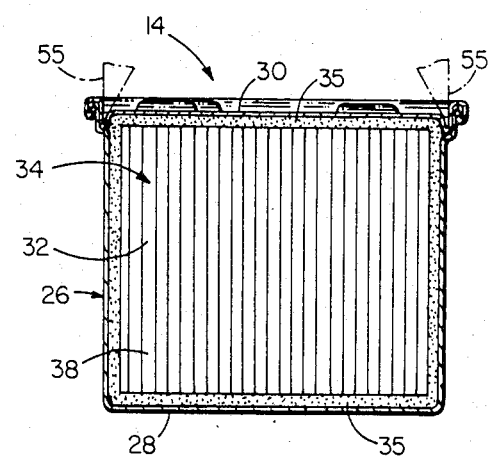
FIG. 9 is a sectional view taken along the line 9—9 of FIG. 6, positioning bosses on the base being shown in phantom.
Figure 10:
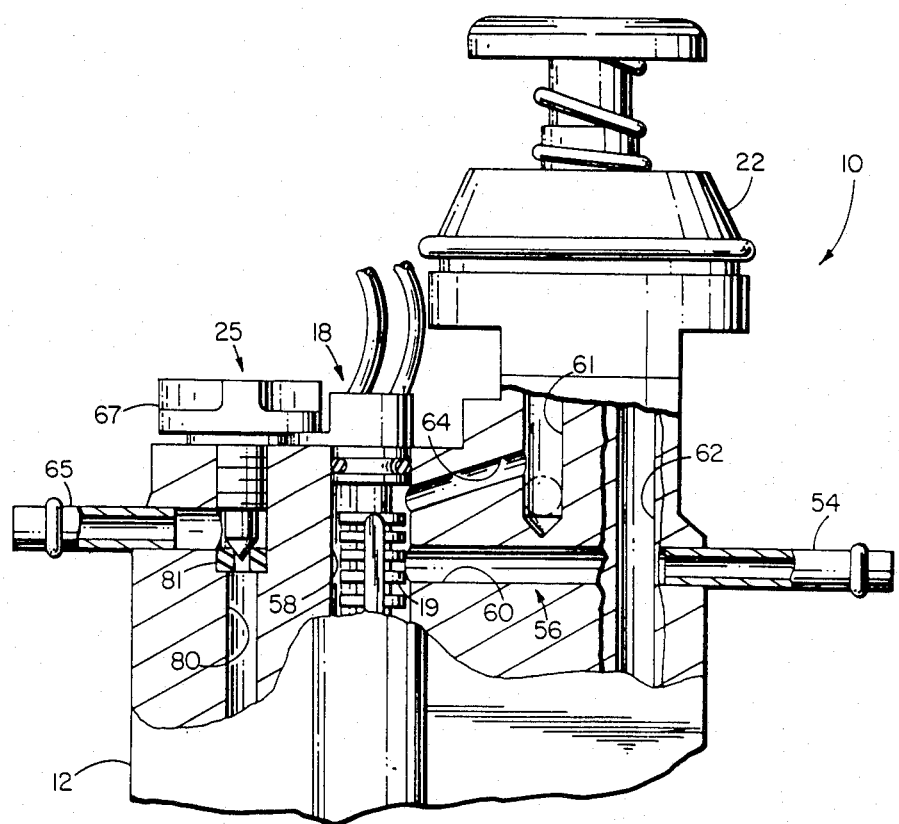
FIG. 10 is a somewhat enlarged fragmentary sectional view of the fuel conditioner as shown in FIG. 4.

An inverted generally U-shaped baffle 43, made from metal or other liquid impervious material, extends between the front and rear walls of the housing 26 adjacent one side of the coalescing element 40 and defines a fluid outlet region of the filter chamber, indicated at 44 and best shown in FIGS. 5 and 6.

A plurality of elastomeric sealing grommets mounted in apertures in the rear wall 30 define inlet and outlet ports in the housing and are adapted for plugging connection in fluid communication with associated tubular connecting members which project in forward direction from the front of the base 12 and which define terminal ends of passageways in the base. One grommet located near the upper end of the housing defines a fluid inlet port 46 which communicates with the upper portion of the filter chamber 32. Another grommet communicates with the fluid outlet region 44 and defines a fluid outlet port 48. Still another grommet located near the bottom wall of the housing 26 defines a drain port 50 in communication with the sump 36. Another grommet defines a port 52 for receiving a probe associated with the signalling device or water sensor 24.

The base 12 may be made from any suitable material but preferably comprises a metal casting and has a plurality of rearwardly projecting bosses 53, 53 which may be selectively drilled and tapped to suit the particular mounting requirements for a desired installation. Additional bosses 55, 55 project in a forward direction from the base and engage the rear wall 30, as shown in phantom in FIGS. 8 and 9, to assure proper positioning of the cartridge 14 in assembly with the base. As previously noted, a plurality of tubular connecting members which define terminal ends of passageways within the base project forwardly from the base for plugging connection in fluid communication with the various ports defined by the grommets in the rear wall 30 whereby fluid communication is established between the various passageways in the base 12 and the filter chamber 32.

The arrangement of the various passageways in the base and the manner in which these passageways cooperate with each other and with the filter element will be best be understood with reference to FIG. 5 wherein the modular fuel conditioner 10 is diagramatically illustrated. A fluid inlet fitting 54 mounted on the base 12 communicates with an inlet passageway, indicated generally at 56, formed in the base and partially defined by a heating chamber 58. More specifically, the inlet passageway 56 includes a first portion 60 which communicates with an upper portion of the heating chamber 58 and with the inlet fitting 54. A second portion of the inlet passageway, indicated by the numeral 62, communicates with a lower portion of the heating chamber 58 and with the priming pump 22 which is mounted on the upper part of the base 12. Another portion of the inlet passageway, designated by the numeral 61, communicates with the priming pump 22 and with a tubular connecting member 63 at the upper portion of the base which is adapted to be received within the inlet port 46. The venting means 25 comprises a vent passageway 80, best shown in FIG. 4, which communicates with the outlet passageway 66 and has a vent outlet 65. A vent plug 67 is threadably engaged in the base 12 and seats on an elastomeric seal 81 at the upper end of the passageway 80. Another vent passageway 64 communicates with the heating chamber 58 above the heating element 19 and with the inlet passageway 56 and prevents any air which may enter the fuel conditioner from accumulating within the heating chamber. The priming pump 22 comprises a diaphragm pump and includes associated check valves which assure unidirectional flow within the inlet passageway and in the direction indicated by the flow arrows in FIG. 5. A return or outlet passageway 66 formed in the base 12 provides communication between a tubular connecting number 68 which projects into the outlet port 48 from the base and a fluid outlet fitting 70 on the base to provide a return flow path from the cartridge 14, as indicated by the directional arrows in FIG. 5.

Figure 11:
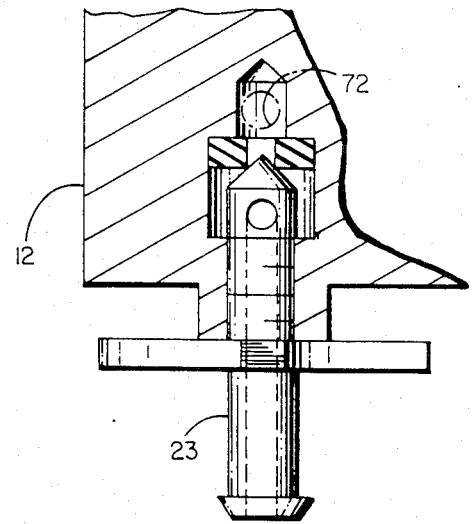
FIG. 11 is a fragmentary sectional view taken along the line 11—11 of FIG. 3.

A drain passageway 72 formed in the base 12 terminates at a forwardly projecting tubular connecting member or drain connection 73 which is received within the drain outlet 50. The opposite end of the drain passageway 72 is connected to the manually operable drain cock 23 located on the lower portion of the base as shown in FIG. 11. The location of the drain cock is optional. In the drawings, the drain cock 23 is shown located in the bottom of the base. However, it may be located in the lower portion of the base at either side of the base, or on the rearward side, as may be necessary for a particular installation.

The water sensor 24, which includes switching electronics and an associated electrical connector, is mounted on the rear surface of the base 12 and has a probe 76 which extends through and projects forwardly of the base for engagement within a port 52 defined by a grommet in the rear wall 30. The sump defines a water collection region of the housing with a capacity of approximately 250 cc. However, water sensor signal level is preferably set at 50 cc to provide an early alert of water ingress.

The filter change signal device 20 comprises a vacuum switch mounted within a recess in the base 12 in communication with the return passageway 66. The vacuum switch includes an associated electrical connector for connection to a power source and an associated signal lamp, for example, to signal the occurrence of an excessive pressure drop in the return flow passageway which indicates filter plugging.

Fuel enters the fuel conditioner through the fuel inlet 46 and flows into the heating chamber 58. The heater 18 is activated within a range of predetermined temperatures based upon anticipated fuel cloud points. Fuel, which may be heated, enters the cartridge 14 at the upper end of the filter chamber 32 and flows down through the two-stage filter assembly after which it passes through the third stage or coalescing element where water in the fuel coalesces and drops into the sump holding region. Clean fuel returns to the base 12 through the return line 66 and leaves the fuel conditioner through the fluid outlet 70.

The manually operated priming pump 22 facilitates priming the fuel conditioner 10 after a cartridge has been replaced. When a new cartridge is in position on the base 12, the vent plug 67 is opened to allow air to escape from the vent passageway 80. The priming pump 22 is then manually operated to pump fuel into the new cartridge and to expel air from the cartridge and associated fuel lines. When all air has been expelled the vent plug is closed to restore the system to normal operation.

The priming pump may also be used to expel air from another part of the fuel supply system, as, for example when some component of the fuel supply system has been removed for replacement. In this instance it may not be necessary to open the vent plug.

The priming pump 22 may also be used to expel water from the fuel conditioner 10. When the water sensor 24 is actuated, indicating that at least 50 cc of water has accumulated in the sump 36, the water drain cock 23 is opened and the manually operated priming pump 22 is operated to forceably expel water collected in the sump. When water ceases to flow from the drain cock 23, the cock is closed to restore the fuel conditioner to normal operation. In the event of fuel exhaustion, the priming pump 22 may be operated to restore the fuel supply system to normal operation after the supply of fuel has been replenished.

I claim:

1. A disposable fuel filter/water separator element comprising a housing having a filter chamber including an upper portion and a lower portion, said lower portion defining a sump, a fuel inlet port communicating with an upper portion of said filter chamber, a fuel outlet port communicating with said lower portion of said filter chamber, a filter assembly disposed within said filter chamber and extending thereacross, said filter assembly separating said upper portion from said lower portion and including a plurality of elements arranged in vertical series and through which fuel flow from said fuel inlet port to said fluid outlet port is constrained to pass, said elements including a primary filter element and a coalescing element, said primary filter element being located between said coalescing element and said upper portion, an inverted generally U-shaped liquid impervious baffle disposed within said lower portion and defining a fluid outlet region of said filter chamber, said fuel outlet port communicating with said lower portion of said filter chamber within said fluid outlet region, said coalescing element and said baffle cooperating to define the upper extent of said lower portion.

2. A disposable fuel filter/water separator element as set forth in claim 1 wherein said fuel outlet port communicates with said fluid outlet region above the lower extent of said coalescing element.

3. A disposable fuel filter/water separator element as set forth in claim 1 including a secondary filter element disposed intermediate said primary filter element and said coalescing element.

4. A disposable fuel filter/water separator element as set forth in claim 1 wherein said housing is generally rectangular, said filter assembly extends transversely of said housing, and said separator element includes sealing compound between said filter assembly and associated sidewalls of said housing sealing said assembly to said associated sidewalls.

5. A disposable fuel filter/water separator element as set forth in claim 1 including a drain port in said housing cooperating with said sump.

6. A disposable fuel filter/water separator element as set forth in claim 5 including another port in said housing communicating with said sump above said drain port.

7. A disposable fuel filter/walter separator element comprising a generally rectangular housing having a filter chamber including an upper portion and a lower portion, said lower portion defining a sump, a fuel inlet port communicating with an upper portion of said filter chamber, a fuel outlet port communicating with said lower portion, a filter assembly disposed within said filter chamber and extending thereacross between said upper portion and said lower portion, sealing compound disposed between said filter assembly and the associated sidewalls of said housing sealing said filter assembly to said housing, said filter assembly separ-ting said upper portion from said lower portion and including a plurality of elements arranged in vertical series and through which fuel flow from said fuel inlet port to said fluid outlet port is constrained to pass, said elements including a rectangular block shaped primary filter element made from filter paper and having a multiplicity of closely spaced pleats, and a coalescing element having a plurality of serpentine pleats, said primary filter element being located between said coalescing element and said upper portion, and an inverted generally U-shaped liquid impervious baffle disposed within said lower portion and defining a fluid outlet region of said filter chamber, said fuel outlet port communicating with said lower portion of said filter chamber within said fluid outlet region, said coalescing element and said baffle cooperating to define the upper extent of said lower portion.

8. A disposable fuel filter/water separator element as set forth in claim 7 including a rectangular block shaped secondary filter element made from filter paper and having a multiplicity of closely spaced pleats and located between said primary filter element and said coalescing element.

* * * * *